UNITED STATES PATENT OFFICE.

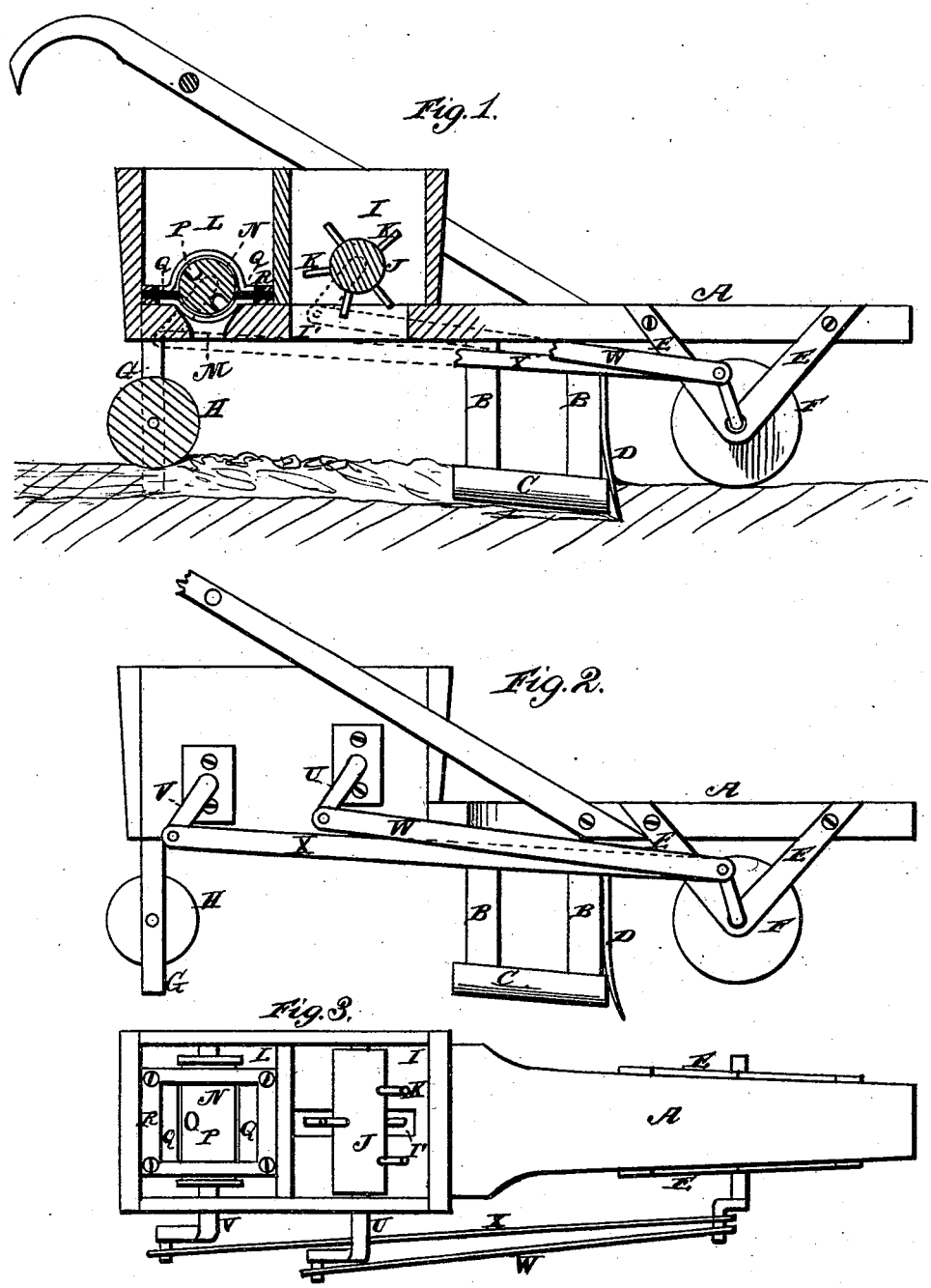

SAMUEL R. McALEXANDER, OF HICKORY VALLEY, TENNESSEE.

COTTON AND SEED PLANTER.

SPECIFICATION forming part of Letters Patent No. 236,603, dated January 11, 1881.

Application filed August 26, 1880. (No model.)

*To all whom it may concern:*

Be it known that I, SAMUEL R. MCALEXANDER, of Hickory Valley, in the county of Hardeman and State of Tennessee, have invented certain new and useful Improvements in Cotton and Seed Planters; and I do hereby declare that the following is a full, clear, and exact description of the construction and operation of the same, reference being had to the annexed drawings, making a part of this specification, and to the letters and figures of reference marked thereon.

This invention has relation to cotton and corn planters combined; and it consists in the features of construction and combination hereinafter fully described, and particularly pointed out in the claim.

Figure 1 is a partial vertical longitudinal sectional view. Fig. 2 is a side elevation, and Fig. 3 is a plan view.

Referring by letter to the drawings, A designates the beam of the implement; B B, two standards, which carry a shoe, C, at their lower ends. The standards and shoe are of wood, while the share D, secured to front standard, is of metal, and its point extends a short distance below the point of the shoe. Hangers E E form bearings for the journals of a crank-wheel, F, near the front of the beam A. In rear of the standards B B is a double hopper, one portion being for cotton-seed and the other for corn. At the rear end of the bottom of the double hopper are secured two coverers, G, between which a roller, H, is journaled in such a manner that the points of the coverers will project below the roller. The front portion, I, of the double hopper is slotted longitudinally of its bottom, as at I', and is provided with a cylinder or rock-shaft, J, having radial teeth or arms K projecting therefrom. The rear portion, L, of the double hopper is provided with a discharge-orifice, M, and is also provided with a cylinder, N, provided with seed-cups P. On each end of this cylinder N are flexible valves Q Q, preferably of rubber, and these valves are held in place by the box-frame R, which is held in place by screws, so that the box-frame may be raised and the valves adjusted nearer to or farther from the cylinder N in order to regulate the quantity of corn to be dropped. The cylinders J and N are journaled in the sides of their respective portions of the double hopper, and are provided with cranks U and V on their journals at one end. A pitman, W, connects the crank U with the crank of the wheel F, and a pitman, X, connects the crank V with the crank of the same wheel.

The operation of the invention will be readily understood from the description taken in connection with the drawings.

The share opens a furrow, the wheel travels before the furrow-opener, and is revolved by frictional contact with the ground, and communicates a rocking motion to both cylinders in the hopper through the pitman and cranks. The cylinder in the cotton-hopper both agitates and forces the cotton through the slot. The cupped cylinder in the corn-hopper receives and drops the corn at regular intervals. The coverers follow and cover the seed, while the roller packs the ground and crushes the clods. The valves brush the corn from the seed-cups, and, being flexible, will not break it in distribution.

I am aware that the covering-shares of a corn-drill have been provided with a rearwardly-extending shaft or arms, by which a roller has been adjustably connected to them in order to follow in their rear and pack the ground after the corn has been covered, as is shown in Patent No. 165,155 of July 6, 1875; also, that a roller has been suspended in vertically-adjustable hangers to run in the rear of the covering-shares, as may be seen in Patent No. 12,672 of April 10, 1855, and I desire to claim neither of these constructions herein.

Having thus fully described my invention, what I claim as new, and desire to secure by Letters Patent, is—

In a cotton and seed planter, the combination of the coverers G G, located at the rear of the seed-dropping mechanism, with the roller H, having its bearings in the shanks of the coverers at a point that will permit the points of the covering-shares to project below the periphery of the roller, substantially as and for the purposes set forth.

In testimony that I claim the above I have hereunto subscribed my name in the presence of two witnesses.

SAMUEL R. McALEXANDER.

Witnesses:
C. H. ANDERSON,
T. A. FUTRALL.